Aug. 17, 1965    M. WELLS    3,200,665
GEARS
Filed Feb. 14, 1963

Martin Wells,
INVENTOR.
WHANN & McMANIGAL
Attorneys for Applicant 3,200,665
GEARS
Martin Wells, 826 Emerald Bay, Laguna Beach, Calif.
Filed Feb. 14, 1963, Ser. No. 258,411
4 Claims. (Cl. 74—446)

This invention relates generally to gears and relates more particularly to composite gears formed of metallic and non-metallic materials.

While the invention has particular utility in connection with composite gears, and is shown and described in such connection, it is to be understood that its utility is not confined thereto. It is also to be understood that the invention is generally applicable to both web and spoke-type gears but is shown and described embodied in a web-type gear.

One of the problems or difficulties involved in the provision of a composite gear wheel is the separation that may occur between the peripheral toothed metal ring and the plastic web of the web-type of gear or the rim of the spoke type and it is an object of the present invention to provide means which will prevent such separation.

Separation between the peripheral metal ring and the supporting plastic portion or web may be due either to ring elongation which may be caused by stretching of the ring from pressure against the teeth, or from the working action of the gear rolling against the other gear or from a combination of both such causes. This problem or difficulty is aggravated when the peripheral toothed ring or band is of soft metal such as, for example, aluminum, and it is another object of the invention to provide means for solving such problem and overcoming such difficulty.

It is still another object of the invention to provide means for securing together the ring and the plastic web supporting same so that one of these parts will not separate from the other.

A further object of the invention is to mechanically tie the peripheral ring and the supporting plastic part of the gear together.

A further difficulty in the manufacture of composite gears of the above described character is the sticking thereof in the mold cavity resulting from the plastic portion shrinking more than the ring and leaving the ring loose on the plastic.

It is therefore a still further object of the invention to so form the gear, including molding of the plastic so as to prevent such sticking.

It is another object of the invention to provide a composite gear of this character that is relatively inexpensive to manufacture.

It is still another object of the invention to provide a gear of this character that is rugged and reliable.

It is a further object of the invention to provide a gear of this character that will stand up under use for very long periods of time and have long life.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

Referring to the drawings, which are for illustrative purposes only:

Figure 1:
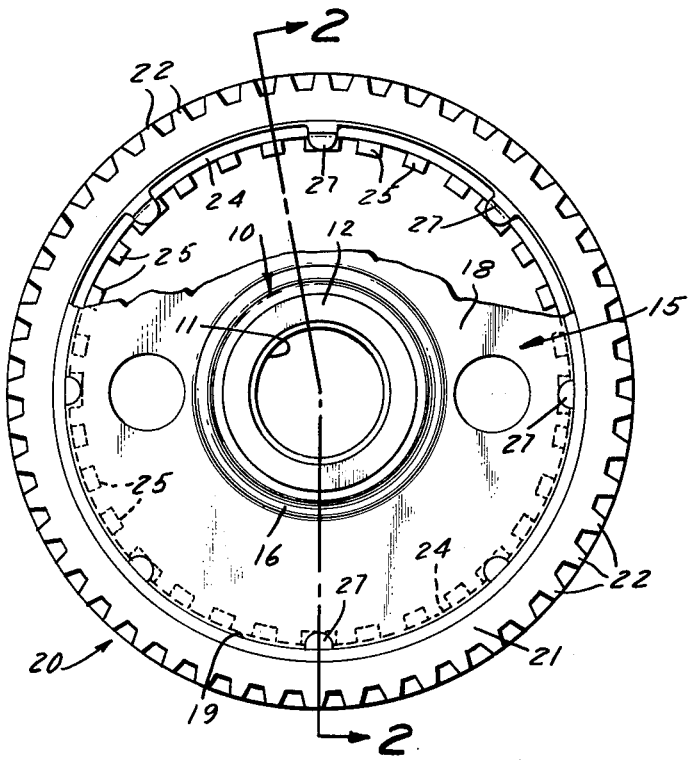
FIG. 1 is a side view of a gear embodying the present invention, portions being broken away to better show the interior construction.

Referring more particularly to the drawings, there is shown a composite gear embodying the present invention as comprising a central or axially arranged hub, indicated generally at 10. Hub 10 is of steel although it may be other material having the characteristics required for any particular installation. This hub comprises a sleeve 11 having an axial opening therethrough for installation on a shaft and there is an annular flange extending radially outwardly at one end.

There are a plurality of outwardly extending flanges or teeth 14 on the exterior of the sleeve 11. These teeth or flanges may be arranged in a herringbone pattern so that certain of said teeth or flanges are inclined in one direction longitudinally of said hub and other teeth are inclined in the opposite direction.

The purpose of this arrangement is to prevent rotational slippage between the hub and web and further to prevent displacement of the plastic web, indicated generally at 15, relative to said hub. Other arrangements may be provided, of course, to prevent such displacement of the hub and web.

Web 15 is formed of any suitable well known molding material such as, for example, macerated or laminated fibrous material impregnated with a suitable resinous binder. The binder may be a thermoset resinous binder of the group consisting of phenol-formaldehyde resins, epoxy resins, melamine-formaldehyde resins, and polyester resins. The fibrous material may be natural cotton fibrous material. Other fibrous material may, of course, be used.

The central portion of the web, indicated at 16, extends longitudinally from the unflanged end of the hub to the flange 12, there being a thinner intermediate annular portion 18 of the web which extends outwardly of the central portion 16. The intermediate portion 18 of the web is positioned in a plane adjacent the unflanged end of the hub and has a peripheral flange 19 extending longitudinally in the direction of the flanged end of said hub.

A metal rim or annulus, indicated generally at 20, is mounted on the periphery of the web. Annulus 20 comprises an annular ring 21 having external teeth 22 thereon. Ring 21 is provided with an internal flange 24 intermediate the sides thereof and substantially aligned with the longitudinal center of the intermediate portion 18 of the web. On the free edge of flange 24 and spaced apart thereon are a plurality of anchoring buttons 25. Buttons 25 are wider than the flange 24 and extend laterally of each side thereof. These buttons 25 are also spaced radially inwardly of the inner side or surface of the ring 21, the heighth of the flange 24 or any other suitable amount, so that material of the web 15 will be disposed beneath said buttons 25 and between said buttons and the inner side or surface of ring 21 to provide mechanical securing or anchoring means tying the web and ring together.

Ring 21 is also provided with a plurality of annularly spaced interior lugs 27 which extend longitudinally of the gear or transversely of the ring. There are fewer lugs 27 than buttons 25, there being eight lugs shown although any suitable number, more or less, may be used.

To begin with, the ends of the lugs 27 are substantially normal to the axis of the gear. The web 15 is molded within the rim or annulus 20, and the material of the web is placed under pressure within the mold.

Figure 2:
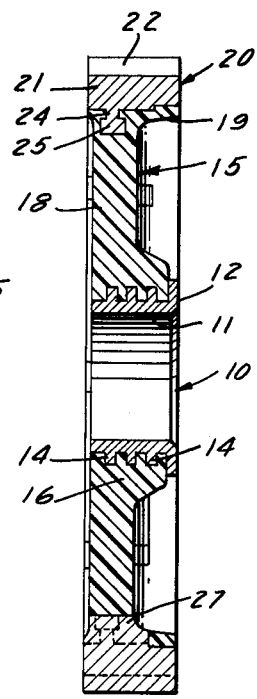
FIG. 2 is a sectional view taken on line 2—2 of FIG. 1.
Figure 3:
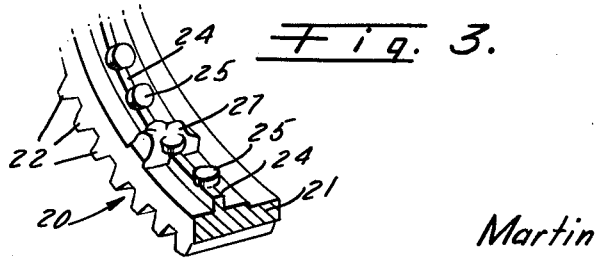
FIG. 3 is a fragmentary perspective view of a portion of the peripheral toothed ring.

The material of the web is forced beneath the buttons 25, as clearly shown in FIG. 2, and into the interstices between the flanges or teeth 14 of the hub. Also, pressure is applied to the ends of the lugs 27 so as to deform said ends and cause them to conform to the configuration of the adjacent portions of the web, so that the ends of said lugs are in the same plane as the adjacent portions of the web.

As the material of the web is placed under pressure there is a radial pressure on the rim or annulus 20, particularly the ring 21, so that said rim or annulus is placed under tension.

The rim or annulus may be of any suitable metal or the like, aluminum being found to be extremely satisfactory. Ring 21, teeth 22, flange 24, buttons 25 and lugs 27 are integrally formed.

An adhesive of any well known type, such as epoxy cement, may be used between the periphery of the web and the adjacent portions of the ring to secure the web or annulus together.

The invention and its attendant advantages will be understood from the foregoing description and it will be apparent that various changes will be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims, wherein various portions have been separated for clarity of reading and not for emphasis.

I claim:
1. A composite gear, comprising:
  (A) an axially arranged steel hub having an axial opening therethrough, an annular radially extending flange at one end of said hub;
  (B) a web of molded resinous material having
    (a) a central portion disposed on the hub,
    (b) an intermediate portion thinner than the central portion,
    (c) and a peripheral flange;
  (C) means securing the web to the hub and retaining the parts against relative rotation and relative longitudinal movement;
  (D) a rim of relatively soft metal on the periphery of the web, said rim including a ring having
    (a) external teeth thereon integral with said ring,
    (b) an internal annular flange integral with said ring and normal to the axis of the gear,
    (c) buttons on said flange and formed integrally therewith, said buttons being annularly spaced apart and spaced from the adjacent inner surface of the ring,
    (d) and a plurality of annularly spaced lugs formed integrally with the ring and internal flange, said lugs extending longitudinally relative to the axis of the gear, said web being molded under pressure to thereby place said ring under radial pressure, said lugs having their ends subjected to pressure to somewhat expand said ends and conform the surfaces of the ends to the configuration of the adjacent portions of the web.

2. A composite gear, comprising:
  (A) an axially arranged hub having an axial opening therethrough;
  (B) a web of plastic molded on said hub, said web having an intermediate portion;
  (C) means retaining the web and hub against relative rotation and relative longitudinal movement;
  (D) a metallic rim on the periphery of the web, said rim comprising an annular ring having
    (a) external teeth thereon,
    (b) an internal annular flange therein,
    (c) buttons on said flange, said buttons being annularly spaced apart and spaced from the adjacent inner surface of the rim,
    (d) and a plurality of annularly spaced lugs formed integrally with the ring and internal flange, said lugs extending longitudinally relative to the axis of the gear, said web being molded under pressure to thereby place said rim normally under radial tension.

3. A composite gear, comprising:
  (A) an axially arranged hub having an axial opening therethrough;
  (B) a metal rim about said hub and including an annular ring having external teeth thereon, and internal annular flange normal to the axis of the gear, buttons on said flange, said buttons being annularly spaced apart and spaced from the adjacent inner surface of the ring, and a plurality of annularly spaced internal lugs on said ring, said lugs extending longitudinally relative to the axis of the gear;
  (C) and a plastic web between the hub and rim, said web being secured to the hub and to the rim, said buttons and lugs being embedded in the peripheral portion of said web for anchoring said rim to said web.

4. In a composite gear:
  (A) an axially arranged hub;
  (B) a metal rim about said hub and including an annular ring having external teeth thereon, an internal annular flange normal to the axis of the gear, and a plurality of buttons on said flange, said buttons being wider than said flange and being annularly spaced apart and spaced from the adjacent inner surface of the ring;
  (C) and a plastic web between the hub and rim, said web being secured to the hub and to the rim, said buttons being embedded in the peripheral portion of said web for anchoring said rim to said web.

References Cited by the Examiner
FOREIGN PATENTS 581,960 8/59 Canada.
243,518 12/25 Great Britain.

DON A. WAITE, *Primary Examiner*.